Jan. 23, 1951   B. HOOVER   2,539,080
FISHING POLE HOLDER
Filed July 23, 1949
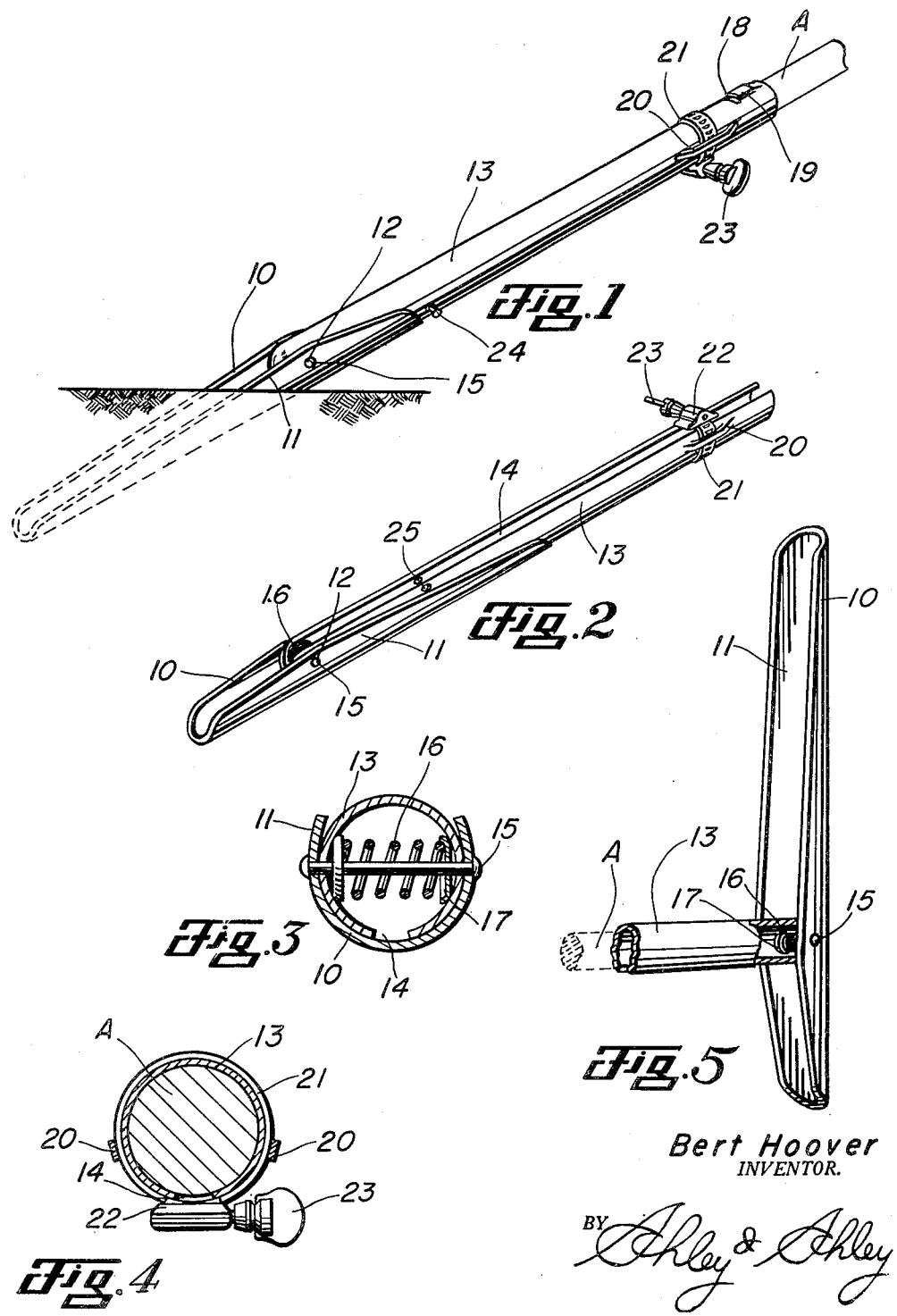
Bert Hoover
INVENTOR.
BY Ashley & Ashley Patented Jan. 23, 1951

2,539,080

UNITED STATES PATENT OFFICE 2,539,080

FISHING POLE HOLDER

Bert Hoover, Oglesby, Tex.

Application July 23, 1949, Serial No. 106,415

10 Claims. (Cl. 248—42)

This invention relates to new and useful improvements in fishing pole holders.

One object of the invention is to provide an improved holder having a socket in which a fishing pole may be fastened and a shoe hinged to the socket so that it may be alined with said socket and inserted in the ground to support the pole at the desired angle or swung to an angular position relative to the socket and rested against the fisherman's body as a brace.

Another object of the invention is to provide an improved holder having a shoe hinged to a pole socket and trough-shaped so that the socket may be swung into it, frictionally held therein and alined therewith.

A further object of the invention is to provide an improved longitudinally-split, tubular pole socket having one end frictionally hinged in a trough-shaped shoe, with means at its opposite end for contracting it to fasten a pole therein.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a perspective view of a fishing pole holder constructed in accordance with the invention and its shoe inserted in the ground, Fig. 2 is a perspective view of the holder, inverted and collapsed, Fig. 3 is an enlarged, transverse, sectional view, taken through the hinge point, Fig. 4 is an enlarged, transverse, sectional view, taken at the clamp band, and Fig. 5 is a perspective view, partly in section, showing the shoe in position as a body brace.

In the drawing, the numeral 10 designates a support or ground shoe which is approximately trough, or U-shaped, in cross-section and preferably formed of resilient metal. The shoe has upstanding side walls 11, the edges of which incline from a high hinge point 12 near the upper or inner ends to both ends thereof, whereby the shoe is reduced from its hinge point to its ends. A tubular pole retainer or socket 13 has its lower or inner end pivoted in the shoe at the point 12 and is split longitudinally so as to leave a longitudinal gap 14. The socket is adapted to receive and retain the butt end of a fishing pole A and has means for opening and closing the gap 14 to secure poles of various diameters therein, the socket being made of thin spring metal.

In one use of the holder, the elongate lower end of the shoe is pushed or driven into the ground in position to support the pole A at the desired angle, with the hinge point 12 and the short end of the shoe above the ground, as is shown in Fig. 1. When the device is not in use, the shoe may be swung 180° so that its elongate end embraces the socket, as is shown in Fig. 2. The side walls 11 may be curved slightly inwardly so as to provide spring clamping jaws for frictionally engaging and receiving the socket in both positions.

The lower end of the split socket 13 is hinged on a transverse pin 15 which has its ends extending through the walls 11 and headed. The shoe and socket have substantially the same transverse curvature and frictional contact is maintained therebetween by a coiled spring 16 surrounding the pin 15 and having its ends seated in dished washers 17 (Fig. 3). The spring 16 being under compression and the washers 17 engaging the inner surface of the socket, it is obvious that a mild force is required to swing the socket upwardly and out of the shoe; therefore, for fishing purposes the socket will be adequately held in the shoe.

At the outer end of the socket a short transverse slot 18 is cut in the top side thereof, the gap 14 being in the underside. The metal between the slot and upper or outer end of the socket is upset to form a clip 19 for receiving one end of a fishing reel (not shown). A short distance from the clip, the wall of the socket is slotted longitudinally and narrow portions upset to form longitudinal keepers 20. A clamp band 21 encircles the socket and passes under the keepers 20 so as to be held in place. The clamp band 20 may be of any suitable construction and the keepers are long enough to permit the sliding of the base of a fishing reel therebeneath. I have illustrated a housing 22 mounted on the overlapping ends of the band and having a thumb piece 23 and means in the housing for contracting or expanding said band when the thumb piece is turned, no claim being made for the particular structure.

When the pole A is inserted in the socket 13, the thumb piece 23 is turned to transversely contract the socket and fasten the pole therein. As an additional fastening means, a nail or pin 24 may be passed through a pair of holes 25 in the socket adjacent the end of the shoe so as to bind the pole in said socket. The socket is long enough so that one end may be contracted by the band 21 and the other end expanded by the spring 16. Where it is not desired to use a reel, the socket may be shorter. The holder may be used as a body brace as is shown in Fig. 5. The shoe is turned at an angle to the socket and the holder inverted so that the longer end is upward. The fisherman places the shoe against his abdomen and grasps the socket.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fishing pole holder including, an elongate trough-shaped shoe having an outer end adapted to be driven into the ground, and an elongate tubular socket adapted to receive the handle end of a fishing pole and having its inner end pivoted in the shoe intermediate the ends thereof so as to rest in said shoe and to extend from the inner end of the shoe in substantial longitudinal alinement therewith.

2. A fishing pole holder as set forth in claim 1, with spring holding means in the socket at its pivot.

3. A fishing pole holder as set forth in claim 1, wherein the shoe is formed to be swung to an angle with the socket and placed against the fisherman's abdomen to support the pole.

4. A fishing pole holder as set forth in claim 1, wherein the socket is split longitudinally, spring means at the pivot of the socket expanding it into frictional engagement with the shoe, and clamping means at the outer end of said socket.

5. A fishing pole holder as set forth in claim 1, and a reel clip on the outer end of the socket coacting with the clamping means.

6. A fishing pole holder including, a U-shaped shoe, a tubular socket having one end hinged in the shoe intermediate the ends of the latter, friction spring means within the socket at its pivot, and pole fastening means on the socket.

7. A fishing pole holder including, a U-shaped shoe, a tubular socket having one end hinged in the shoe intermediate the ends of the latter, the shoe and socket being longitudinally alined, the socket having its inner end split, a pivot pin connecting the hinged end of the socket with the shoe, and a spring surrounding the pin within the socket.

8. A fishing pole holder including, a trough-shaped shoe, and a tubular socket having one end pivoted in the shoe, whereby the socket may be swung into the shoe and alined therewith, the walls of the shoe being resilient to frictionally embrace the socket and to yield when the socket is swung.

9. A fishing pole holder including, a resilient shoe adapted to be inserted in the ground at the angle at which it is desired to support a fishing pole, and a pole socket frictionally engaged in the shoe and having one end hinged therein, the socket and shoe being longitudinally alined.

10. A fishing pole holder as set forth in claim 9, wherein the socket has a longitudinal split, and fastening means on the socket.

BERT HOOVER.

REFERENCES CITED

The following references are of record in the file of this patent:

UNITED STATES PATENTS

| Number | Name | Date |
| --- | --- | --- |
| 1,155,589 | McDonald | Oct. 5, 1915 |
| 2,071,257 | Hansen | Feb. 16, 1937 |
| 2,199,034 | Witczak | Apr. 30, 1940 |
| 2,204,692 | Parisio | June 18, 1940 |
| 2,249,302 | Smith | July 15, 1941 |
| 2,427,600 | Hanke | Sept. 16, 1947 |